United States Patent
Haynes

(10) Patent No.: US 6,619,584 B1
(45) Date of Patent: Sep. 16, 2003

(54) ROAD/AIR VEHICLE

(76) Inventor: Robin Haynes, 11960 Heritage Oak Pl., Suite 21, Auburn, CA (US) 95603

( * ) Notice: Subject to any disclaimer, the term of this patent is extended or adjusted under 35 U.S.C. 154(b) by 0 days.

(21) Appl. No.: 10/096,755

(22) Filed: Mar. 11, 2002

(51) Int. Cl.$^7$ .............................................. B64C 37/00
(52) U.S. Cl. ................... 244/2; 244/50; 244/49
(58) Field of Search ............................ 244/2, 50, 45 R, 244/49, 45 A, 46, 39

(56) References Cited

U.S. PATENT DOCUMENTS

| | | | |
|---|---|---|---|
| 2,011,254 A | | 8/1935 | Nightingale |
| 2,402,468 A | | 6/1946 | Thompson |
| 2,609,167 A | | 9/1952 | Gero, Jr. |
| 2,674,422 A | * | 4/1954 | Pellarini ..................... 244/49 |
| 2,713,465 A | | 7/1955 | Novinger |
| 2,767,939 A | | 10/1956 | Taylor |
| 2,940,688 A | | 6/1960 | Bland |
| 3,012,737 A | | 12/1961 | Dodd |
| RE25,368 E | * | 4/1963 | Rethorst ................... 244/12.4 |
| 3,322,223 A | * | 5/1967 | Bertelsen ................... 180/120 |
| 3,371,886 A | | 3/1968 | Schertz |
| 4,269,374 A | | 5/1981 | Miller |
| 4,537,373 A | | 8/1985 | Butts |
| 4,579,297 A | | 4/1986 | Ayoola |
| 4,627,585 A | | 12/1986 | Einstein |
| 4,778,129 A | | 10/1988 | Byford |
| 4,802,639 A | * | 2/1989 | Hardy et al. ............. 244/137.4 |
| 4,881,700 A | * | 11/1989 | Sarh ................ 244/2 |
| 4,881,701 A | | 11/1989 | Bullard |
| 4,986,493 A | | 1/1991 | Sarh |
| 5,050,817 A | | 9/1991 | Miller |
| 5,201,478 A | * | 4/1993 | Wooley ..................... 244/120 |
| 5,356,094 A | * | 10/1994 | Sylvain ..................... 244/123 |
| 5,407,150 A | * | 4/1995 | Sadleir ..................... 244/12.4 |
| 5,505,407 A | * | 4/1996 | chiappetta .................. 244/12.5 |
| 5,836,541 A | | 11/1998 | Pham |
| 5,984,228 A | | 11/1999 | Pham |
| 6,224,012 B1 | | 5/2001 | Wooley |

OTHER PUBLICATIONS

LaBiche Aeorspace, Inc., 2001—web page—1 page.

* cited by examiner

*Primary Examiner*—Charles T. Jordan
*Assistant Examiner*—Stephen A Holzen
(74) *Attorney, Agent, or Firm*—Bernhard Kreten

(57) ABSTRACT

A road/air vehicle is able to quickly and easily convert between two configurations, air configuration and road configuration, to facilitate practical operation as both an aircraft and as an automobile. In air configuration the craft includes two laterally symmetrically flight surfaces; a smaller forward canard wing, generally horizontally disposed and a larger rearward main wing generally horizontally disposed with fin surfaces, generally vertically disposed, at each tip. Control surfaces on the main wing, the canard wing and the tip fins severally provide roll control, pitch control and yaw control in flight. The wheels/undercarriage are of a laterally symmetrical rectangular pattern, with the lateral distance between the two forward wheels and the two rearward wheels being similar. The forward wheels are steerable for ground operations. A suitable powerplant drives the rear wheels for ground operations. A second suitable powerplant provides direct atmospheric thrust for flight operations. In road configuration all flight surfaces and avionics sensors are folded and stored inside compartments within the body of the craft. Controls to facilitate both ground and flight operations are available for a single operator to perform the functions of both driver in road configuration and pilot in air configuration.

19 Claims, 23 Drawing Sheets

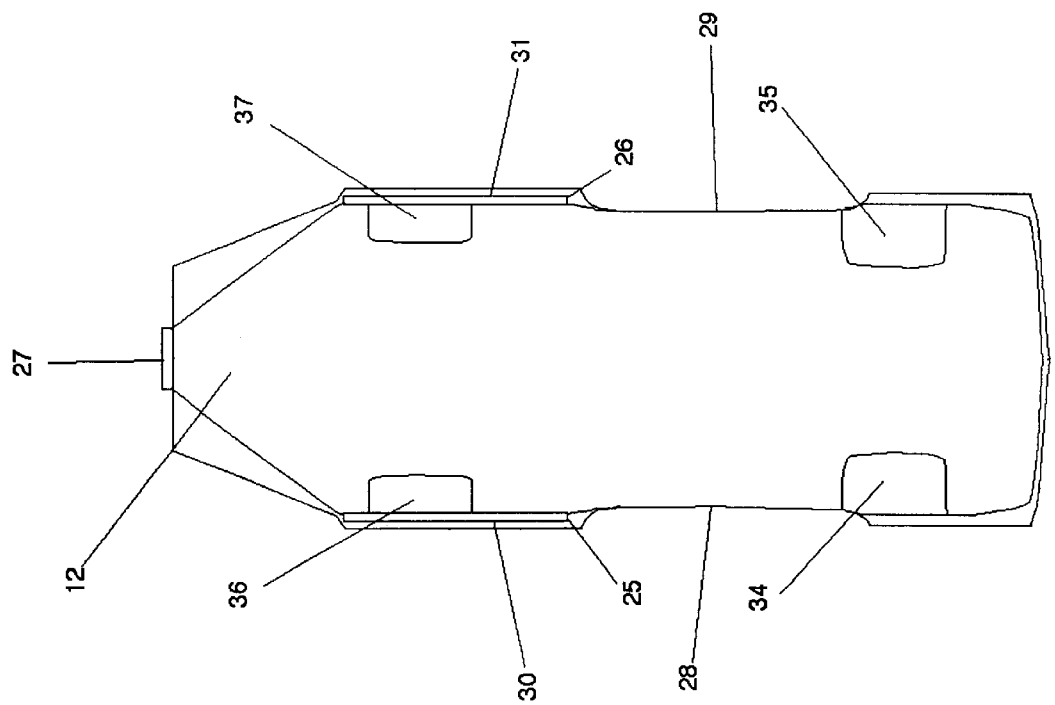
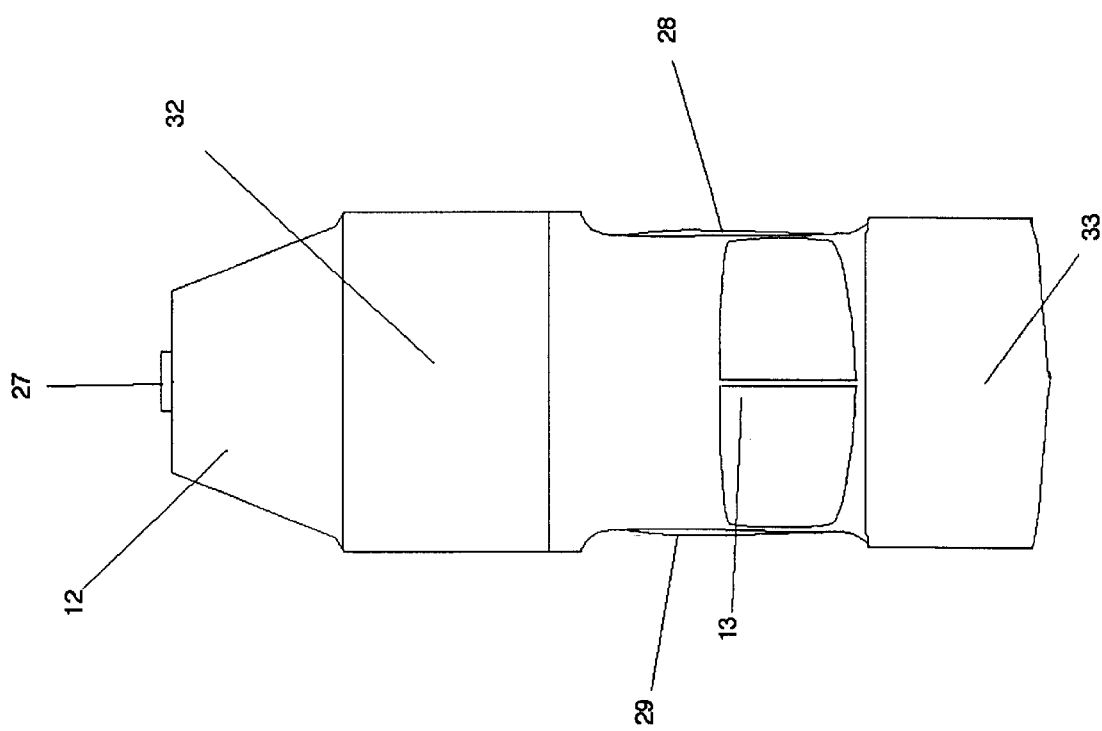

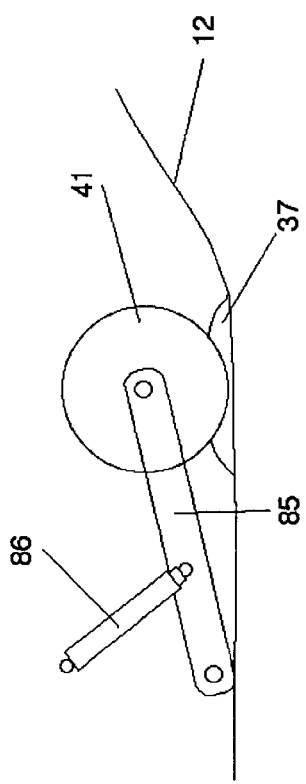
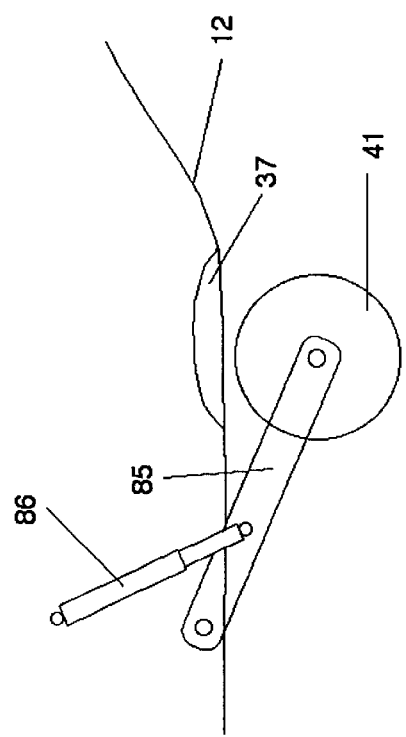

ROAD/AIR VEHICLE

FIELD OF THE INVENTION

The present invention relates generally to motorized transportation vehicles, and more specifically to a craft having the ability to interchangeably convert between an aircraft configuration and an automobile configuration. The craft includes numerous novel features relating to the practicality and safety of such a vehicle, such as secure stowage of all flight surfaces and avionics sensors during ground operations, the use of separate, discreet power plants for ground and flight operations and other novel features.

BACKGROUND OF THE INVENTION

The idea of a vehicle, which is capable of both flight operation and highway operation, has been a dream since shortly after the development of the first powered aircraft in the early part of the twentieth century. Numerous inventors have attempted to produce such a combination craft, generally known as a flying car or roadable aircraft. Some of these attempts have met with limited success, in two cases the machines have been type certified by the Civil Aeronautics Agency (now the Federal Aviation Administration) as production aircraft. However, none of these craft have been commercially successful or particularly practical. The design requirements of a ground vehicle are entirely different to those of an airplane and the result of trying to marry the two together into one craft has hitherto been to produce a vehicle which is impractical in either environment.

In order to afford true practicality and safety, all flight surfaces and avionics sensors must be securely stowed within the body of the vehicle during ground operations, so that these essential and delicate components are protected from damage or tampering. The craft must also have a body size and shape that allows it to be operated conveniently as an automobile; to fit within a regular parking space and a single car garage.

In order to satisfy both of these requirements, flight surfaces must be articulated in such a way as to occupy a relatively small space during ground operations and yet also be capable of being securely deployed in their extended position during flight operations. One design, Pat. No. 4,269,374—Miller, has flight surfaces that all fold within the body, however the method of folding and the choice of conventional empennage design result in an aircraft with insufficient wing area and an impractical shape for operation as an automobile.

Another overriding limitation on the practicality of such a craft lies in the limitations and requirements of the power plant. The power requirements of a ground vehicle and an aircraft are entirely different. Not only does an aircraft require generally more power than does a ground vehicle but the steady, sustained, thrust required of an aircraft is entirely different to the wide torque range and fast response required of a ground vehicle. Previous inventions have generally relied on a single power source, a gasoline engine, with some kind of transmission linkage to drive either a propeller for flight operations or the vehicle wheels for ground operations. This arrangement, while appearing attractive, actually carries a severe weight penalty and does not supply the type or amount of power required for both operating modes.

A discussion of the related art of which the present inventor is aware, and its differences and distinctions from the present invention, is provided below.

U.S. Pat. No. 2,713,465 issued on Jul. 19, 1955 to Harry E. Novinger describes a Combined Air-Ground Vehicle having an airfoil shaped forward fuselage or body and an upwardly and rearwardly disposed wing, resulting in a negative stagger biplane configuration. Large side members serving as end or tip plates for the relatively low aspect ratio fuselage and wing connect the fuselage and rearward wing. The flight components cannot be folded or stowed for ground operations, unlike the present road/air vehicle. The craft utilizes a single gasoline engine for both ground and flight operations. Novinger's short span, low aspect ratio upper wing and fuselage provide for relatively poor flight ability. The tricycle wheel arrangement of the Novinger machine is unlike the more stable rectangular pattern of the wheels of the present road/air vehicle.

U.S. Pat. No. 2,767,939 issued on Oct. 23, 1956 to Moulton B. Taylor describes a Flying Automotive Vehicle Assembly, comprising a left and right wing structure, tail cone structure, and empennage, all of which are separable from a central automobile or cabin structure. The wings fold rearwardly against the tail cone of the assembly, which is removed from the automobile or cabin structure and towed behind for road use. The flight components cannot be folded or stowed for ground operations, unlike the present roadable aircraft. The craft utilizes a single gasoline engine for both ground and flight operations. This is one of only two road/air vehicle or flying car designs ever certified for production by the CAA or FAA.

U.S. Pat. No. 2,940,688 issued on Jun. 14, 1960 to Edward F. Bland describes a Roadable Aircraft And Sailboat having a lifting body configuration somewhat in the manner of the fuselage shape of the Novinger craft discussed further above. However, the rear fuselage includes a central channel before the rear propeller, somewhat in the manner of one nacelle or channel of the twin engine Custer Channel Wing aircraft developed in the 1950s. The Bland craft also includes folding wings, which may be folded with their spans rearwardly atop the fuselage for road use, or which may be extended vertically to serve as sails. The flight components cannot be folded or stowed for ground or water operations. The craft utilizes two engines, one for road and water use and the other for airborne use. However, the two engines are of similar design and may be linked together to provide the required power for takeoff and climb when used as an aircraft. This arrangement is unlike the two-engine configuration of the present road/air vehicle, which utilizes entirely different types of engines for ground and flight operations.

U.S. Pat. No. 3,012,737 issued on Dec. 12, 1961 to David R. Dodd describes a Combination Land And Air Vehicle having a twin boom tail assembly and folding wings. The wings fold in a spanwise direction as well as at the roots, with the leading portion folding forwardly and horizontally next to the fuselage, and the rearward portion folding downwardly to form an essentially vertical surface parallel to the fuselage sides when folded. The wings remain external during ground operations. The tail assembly does not fold. The flight components cannot be folded or stowed for ground operations, unlike the present road/air vehicle. The craft utilizes a single gasoline engine for both ground and flight operations. The tricycle wheel configuration is unlike the square wheel configuration of the present craft.

U.S. Pat. No. 3,371,886 issued on Mar. 5, 1968 to Robert O. Schertz describes an Aircraft Adapted For Highway Usage, having a rearwardly disposed main wing, a forwardly disposed canard surface and a four-wheel configuration as in the current invention. However, Schertz uses large vertical stabilizers at the roots of the main wing, rather than the smaller lighter fins at the wing tips of the current invention.

No provision is made for secure stowage of the wings, which remain external during ground operation and only one engine is utilized for both ground and flight operations.

U.S. Pat. No. 4,269,374 issued on May 26, 1981 to Harvey R. Miller describes a Combined Road Vehicle And Aircraft, in which the wings, tail assembly and propeller drive all fold into the structure of the body or cabin portion for carriage during road use. However, the craft is of a conventional, tailplane empennage, configuration and the wings rotate and fold parallel to the body, similarly to the folding configuration of the Dodd craft discussed further above. The lack of intermediate folding for the wings, resulting in a short span craft, as well as the conventional wing configuration result in a craft unlike that of the present invention. The craft utilizes a single gasoline engine for both ground and flight operations.

U.S. Pat. No. 4,627,585 issued on Dec. 9, 1986 to Harry Einstein describes a pusher type aircraft of conventional tail empennage design. For ground operations the main wing is folded spanwise at the wing root and at about ⅔rds span so that the wings fold to the center and lay one on top of another. Also the tail empennage is extended forwards on a sliding boom for ground operations, effectively reducing the length of the vehicle. The landing gear is of a tricycle type. A pusher type propeller is driven by an aviation engine located within the fuselage and the design does utilize an independent engine, also located within the fuselage, to drive the wheels for land use. The flight components cannot be securely stowed inside the body of the craft for ground operations.

U.S. Pat. No. 4,579,297 issued on Apr. 1, 1986 to Joseph N. Ayoola describes an Air, Land and Sea vehicle of conventional, tailplane empennage configuration. The craft utilizes four wheels that move outwardly for highway use, and inwardly into stored position for flight and water use. The flight surfaces do store within enclosed compartments for water and flight use, however the empennage surfaces slid into slots at the rear of the craft and the main wing folds from the wing root as well as telescoping. The craft utilizes separate propulsion systems for the water and flight modes, however there is only aerodynamic propulsion for ground use.

U.S. Pat. No. 4,881,701 issued on Nov. 21, 1989 to Gary M. Bullard describes a Combination Automobile And Airplane having a two place tandem, pusher engine, canard configuration, somewhat like the configuration of the Vari-Eze and Long-Eze aircraft designs of Burt Rutan. However, the canard wings do not fold and the main wings fold externally to the craft. The craft uses a propeller for flight operations which is disengaged for road use. The craft has no secure stowage of the wings and does not utilize discreet power plants, as is in the current road/air vehicle.

U.S. Pat. No. 5,050,817 issued on Sep. 24, 1991 to Harvey R. Miller describes a Combined Road And Aircraft Vehicle of a similar configuration to the vehicle of the U.S. Pat. No. 4,269,374 to the same inventor, discussed further above. The primary difference is that the vehicle of the '817 Patent stores the wings along the sides of the road vehicle, rather than in storage compartments in the sides of the road vehicle, as in the '374 Patent. Other features, e. g., tail folding, are similar between the two Miller patents, and are unlike the means used in the present invention.

U.S. Pat. No. 5,435,502 issued on Jul. 25, 1995 to Kenneth G. Wernicke describes a Flying And Road Vehicle of a configuration similar to that of the '465 U.S. Patent to Novinger discussed further above, i. e., having a relatively low aspect ratio wing to meet maximum road width requirements without folding. None of the Wernicke flight components can be folded or stowed for ground operations, unlike the present road/air vehicle. The craft utilizes a single gasoline engine for both ground and flight operations.

U.S. Pat. No. 5,984,228 issued to Roger Pham on Nov. 16, 1999 describes a three surface aircraft with a one-piece main wing rotatably mounted on top of the fuselage. The aircraft's wing is enlargeable with additional wing tip segments. Propulsion is by a ducted fan in flight mode and a hydraulically driven rear wheel in ground mode. The flight components cannot be stowed for ground operations, unlike the present roadable aircraft. The craft utilizes a single gasoline engine for both ground and flight operations.

U.S. Pat. No. 6,224,012 issued to Donald H. Wooley on May 1, 2001 describes a Roadable aircraft with a single power source to propel the vehicle in flight and on the ground through aerodynamic thrust. The craft is a canard configuration with a main wing, which swivels 90° for ground operations. The canard does not fold. The flight components cannot be stowed for ground operations, as in the present roadable aircraft. The craft utilizes a single gasoline engine for both ground and flight operations and has a tricycle type wheel arrangement.

An aircraft design presented by Labiche Aerospace at http://www.labicheaerospace.com describes a craft with the look of a sports car but with three flight surfaces, which unfold for flight operations. The present inventor does not know of any patent filed on this craft. The labiche design differs from the present invention in its use of three flight surfaces, the folding a swinging action of the main wing, the lack of secure stowage of the rear flight components and the use of a single gasoline engine for both ground and flight operations.

Finally, a publication titled Roadable Aircraft—From Wheels To Wings, by Palmer Stiles, copyright 1994 and published by Custom Creativity, Inc., Melbourne, Fla., includes a comprehensive, but not exhaustive, collection of at least portions of U.S. Utility and Design Patents issued for road/air vehicle and flying automobiles. None of the patents published in the book, but not discussed in detail further above, are felt to be more closely related to the present invention than those discussed herein.

None of the above inventions and patents, either singly or in combination, is seen to describe the instant invention as claimed.

The following prior art reflects the state of the art of which applicant is aware and is included herewith to discharge applicant's acknowledged duty to disclose relevant prior art. It is stipulated, however, that none of these references teach singly nor render obvious when considered in any conceivable combination the nexus of the instant invention as disclosed in greater detail hereinafter and as particularly claimed.

| PATENT NO. | ISSUE DATE | INVENTOR |
| --- | --- | --- |
| 4,627,585 | December, 1986 | Einstein |
| 4,986,493 | January, 1991 | Sarch |
| 2,713,465 | July, 1955 | Novinger |
| 2,767,939 | October, 1956 | Taylor |
| 2,940,688 | June, 1960 | Bland |
| 3,012,737 | December, 1961 | Dodd |
| 3,371,886 | March, 1968 | Schertz |
| 4,269,374 | May, 1981 | Miller |

-continued

| PATENT NO. | ISSUE DATE | INVENTOR |
|---|---|---|
| 4,881,701 | November, 1989 | Bullard |
| 5,050,817 | September, 1991 | Miller |
| 5,435,502 | July, 1995 | Wernicke |
| 6,224,012 | May, 2001 | Wooley |
| 2,011,254 | August, 1935 | Nightingale |
| 2,402,468 | June, 1946 | Thompson |
| 2,609,167 | September, 1952 | Gero |
| 2,674,422 | April, 1954 | Pellarini |
| 3,012,737 | December, 1961 | Dodd |
| 4,579,297 | April, 1986 | Ayoola |
| 4,778,129 | October, 1988 | Byford |
| 5,836,541 | November, 1998 | Pham |
| 4,537,373 | August, 1985 | Butts |
| 5,984,228 | November, 1999 | Pham |

The other prior art listed above but not specifically described further catalog the prior art of which the applicant is aware. These references diverge even more starkly from the references specifically distinguished above.

SUMMARY OF THE INVENTION

The present invention comprises a road/air vehicle, which may be reversibly changed from an aircraft configuration to an automobile configuration. The aircraft configuration comprises two flying surfaces, with a generally centrally and rearwardly located main wing, having two vertical fins at the tips providing directional stability and rudder control, plus a smaller forward surface serving as a canard stabilizer and providing pitch control.

Conversion from flight to ground mode is accomplished in the following way: Four doors are opened in the body, a door in the forward upper portion of the body, a door in the upper center section of the body and a door in the each of the left and corresponding right center sides of the body. The left and corresponding right canard wings swing approximately 180° from their wing roots to rest within the extent of the body, one resting above the other. Concurrently the left and corresponding right main wings, divided into four section, are folded spanwise between each section in alternating opposing directions. The first section, not a flying surface but a connecting arm remaining at all times within the body craft, beginning at a point adjacent to the center of the craft and running to the wing root, swings downwards approximately 90°. The second section, lateral to the first, starting at the wing root and running to a point approximately ⅓ of the span, swings upwards approximately 180°. The third second, lateral to the second section, running from the extent of the second section to a point approximately ⅔ of the span, swings downwards approximately 180°. The fourth section, lateral to the third, running from the extent of the third section to the wing tip, swings upwards approximately 180°. In this way the wing sections folded positions are adjacent and parallel to each other, one laying against the other, and approximately vertical. The left and corresponding right center most hinge points are displaced vertically so that the wing tips, which are approximately horizontal in their folded positions, rest one above the other. Finally the four doors described above are closed, enclosing the folded wings within the body. Locking means at each of the hinge points secure the wings in their unfolded and folded positions. Locking means also secure the doors.

The present road/air vehicle uses a laterally symmetrical rectangular wheel or landing gear configuration, which is retractable into enclosed compartments for flight operations. A gasoline engine through an automatic transmission for ground operations drives two of the wheels. Two forwardly disposed wheels are steerable for ground operations.

The motive power system comprises a gasoline engine/transmission unit mounted in the center/front section of the body driving the front or rear wheels for ground operations and a jet thrust powerplant mounted in the rearward section of the body to provide forward thrust for flight operations.

OBJECTS OF THE INVENTION

Accordingly it is a principal object of the invention to provide an improved road/air vehicle having jet thrust power for flight operations and discreet torque power for ground operations. It is another object of the invention to provide an improved road/air vehicle having two symmetrically lateral flight surfaces, comprising a canard wing plus a main wing with tip fin stabilizers. It is another object of the invention to provide an improved road/air vehicle including multiply folding flight components, which components remain attached to the structure and are securely stowed within the body of the craft for ground operations. It is a further object of the invention to provide an improved road/air vehicle that discrete power supplies for the two available modes. With a jet engine providing forward thrust for air operations and an suitable engine/transmission unit providing direct drive to the crafts wheels for ground operations.

It is a further object of the invention to provide an improved road/air vehicle having a rectangular, laterally symmetrical, retractable undercarriage configuration comprising two rearwardly disposed wheels and two, steerable, forwardly disposed wheels for ground operation.

It is a further object of the invention to provide improved elements and arrangements thereof in an apparatus for the purposes described which are, dependable and fully effective in accomplishing its intended purposes.

These and other objects will be made manifest when considering the following detailed specification when taken in conjunction with the appended drawing figures.

BRIEF DESCRIPTION OF THE DRAWINGS

FIG. 10 is a view from above in road mode.

FIG. 11 is a view from below in road mode.

FIGS. 24a and b are schematics of suspension and wheel retraction means of rear wheels.

DESCRIPTION OF PREFERRED EMBODIMENTS

Figure 1:
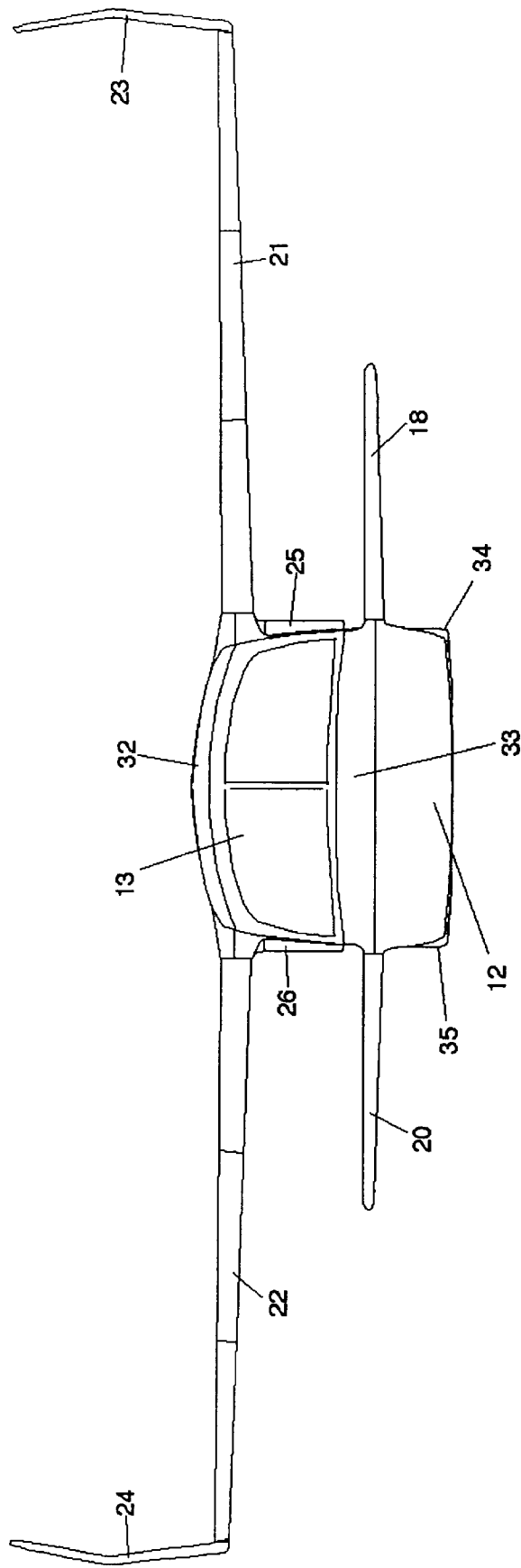
FIG. 1 is a view from front in air mode.
Figure 2:
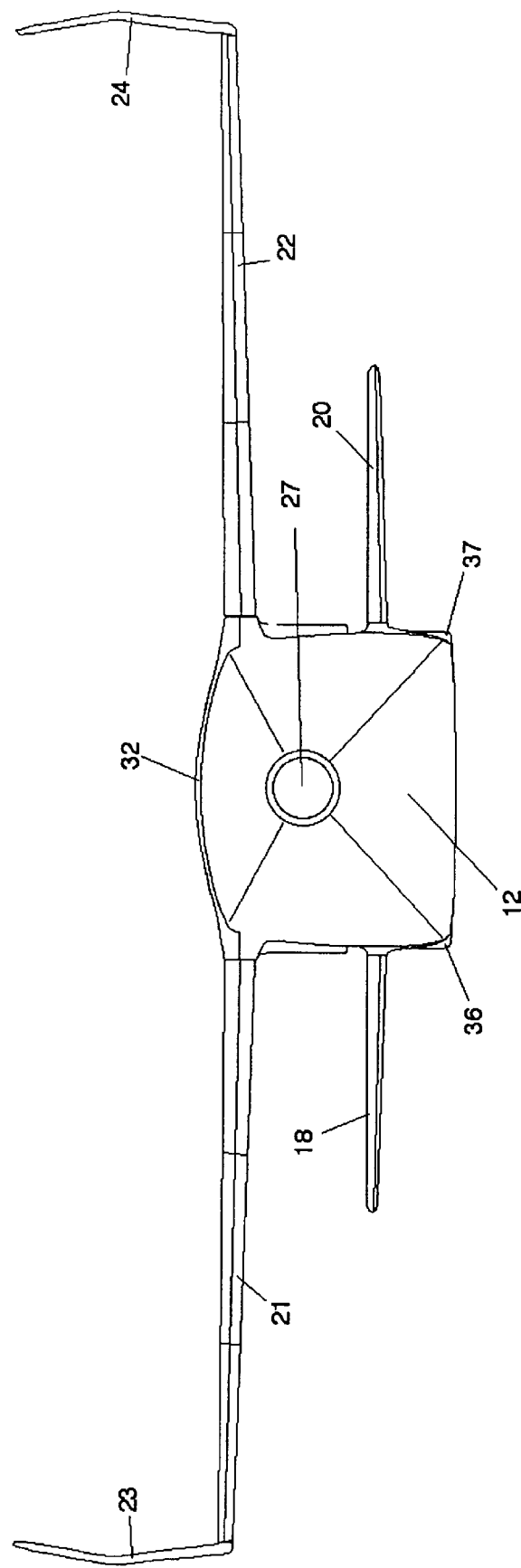
FIG. 2 is a view from rear in air mode.
Figure 3:
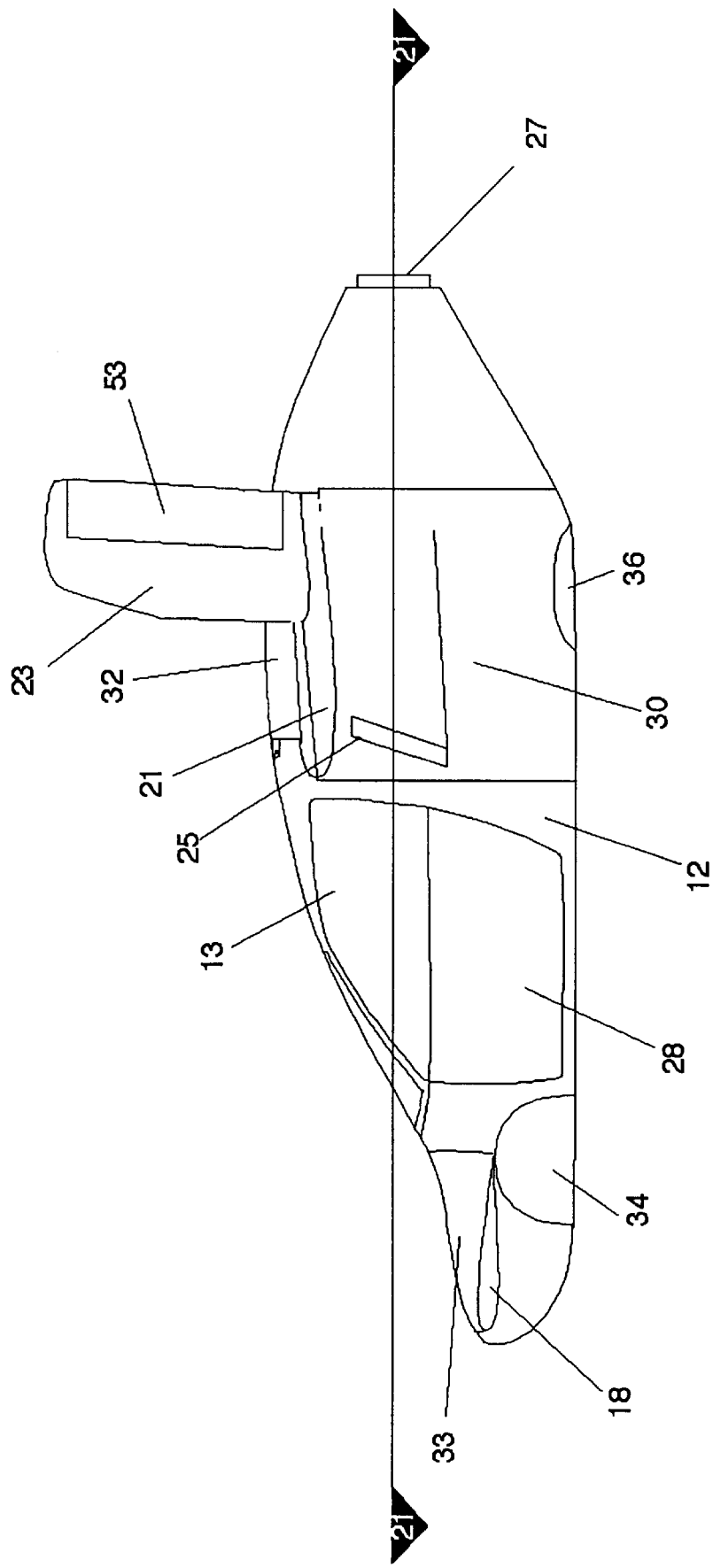
FIG. 3 is a view from left side in air mode.
Figure 4:
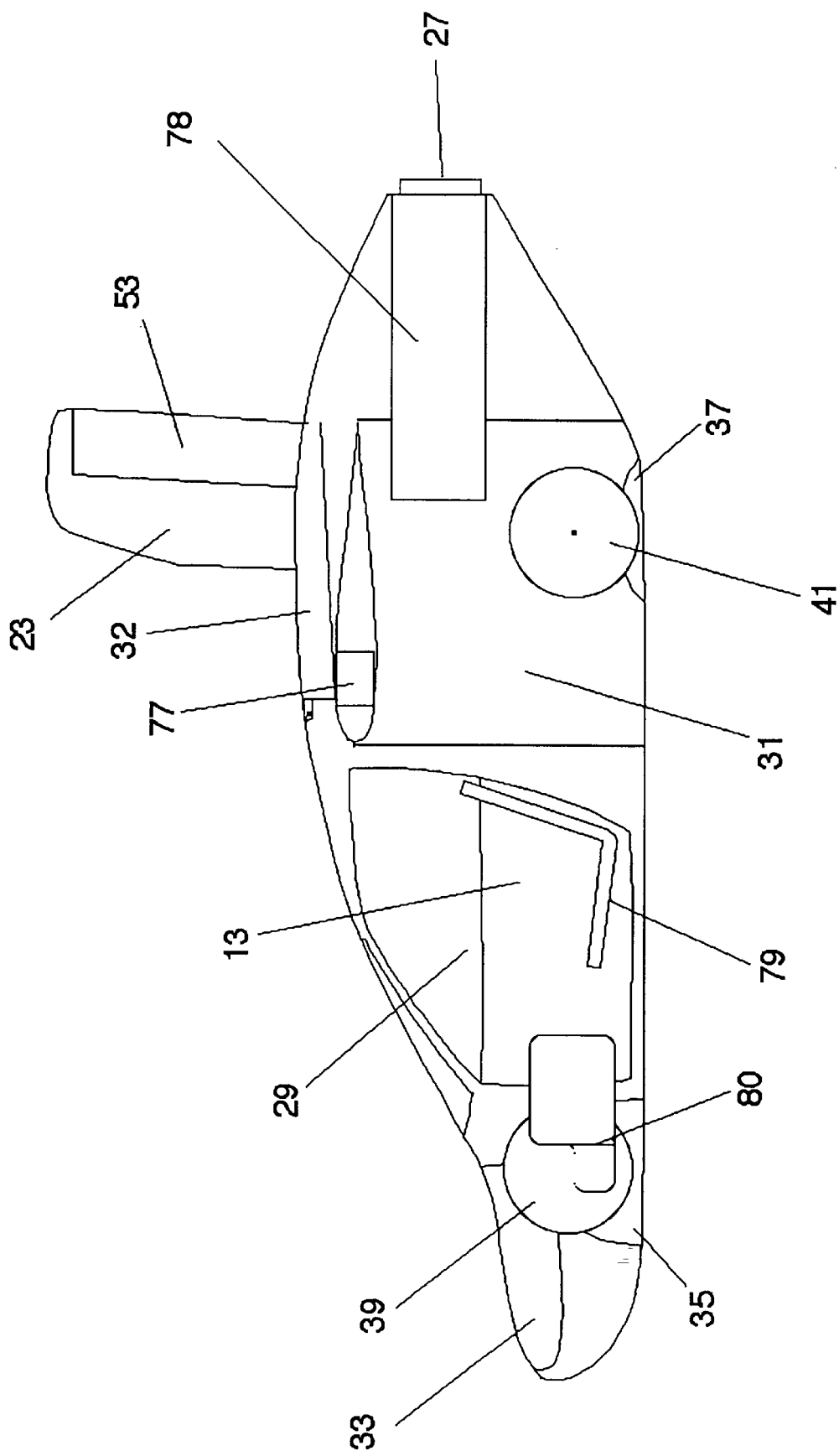
FIG. 4 is a sectional view from left side in air mode taken along lines 4—4 of FIG. 5.
Figure 5:
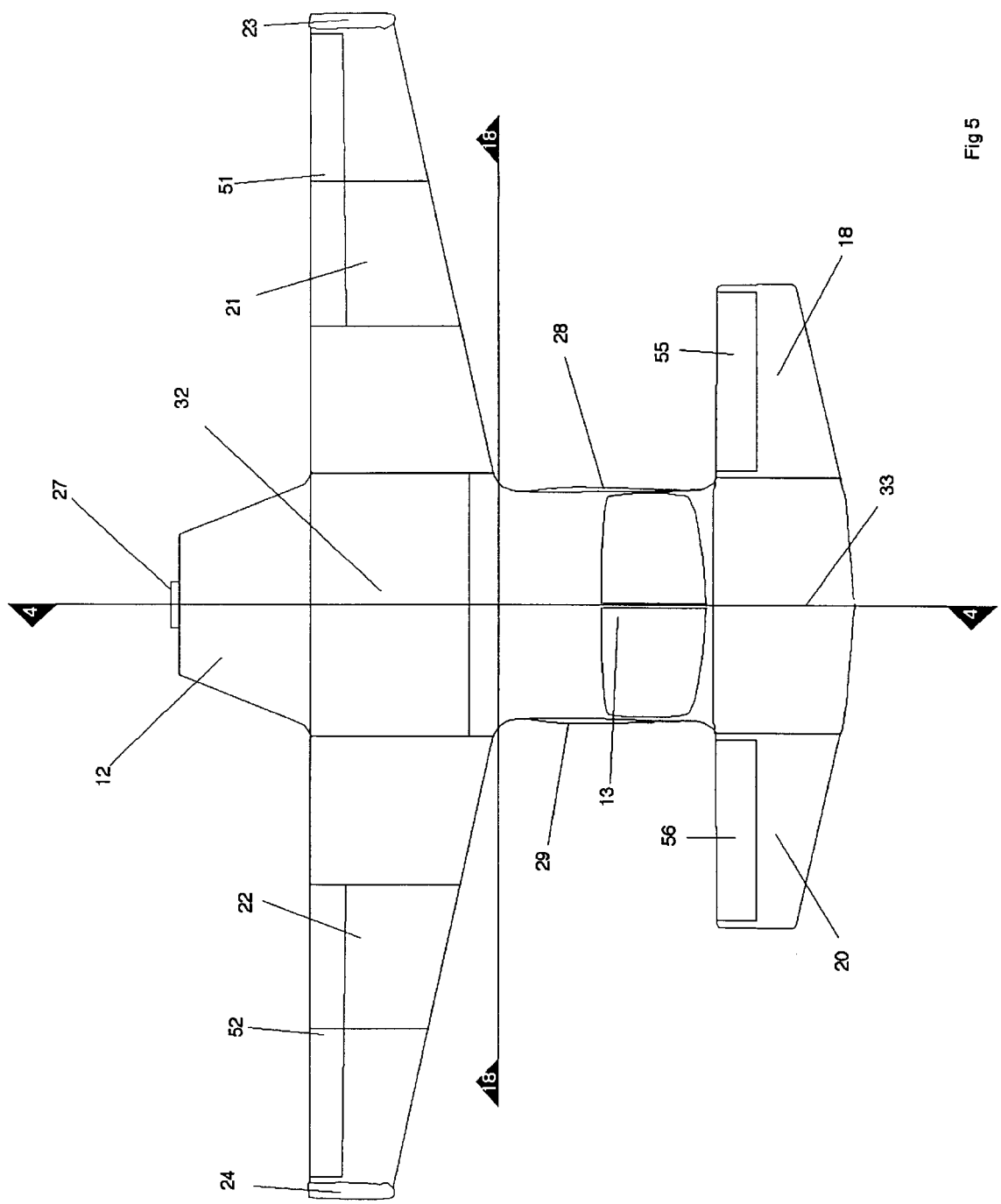
FIG. 5 is a view from above in air mode.
Figure 6:
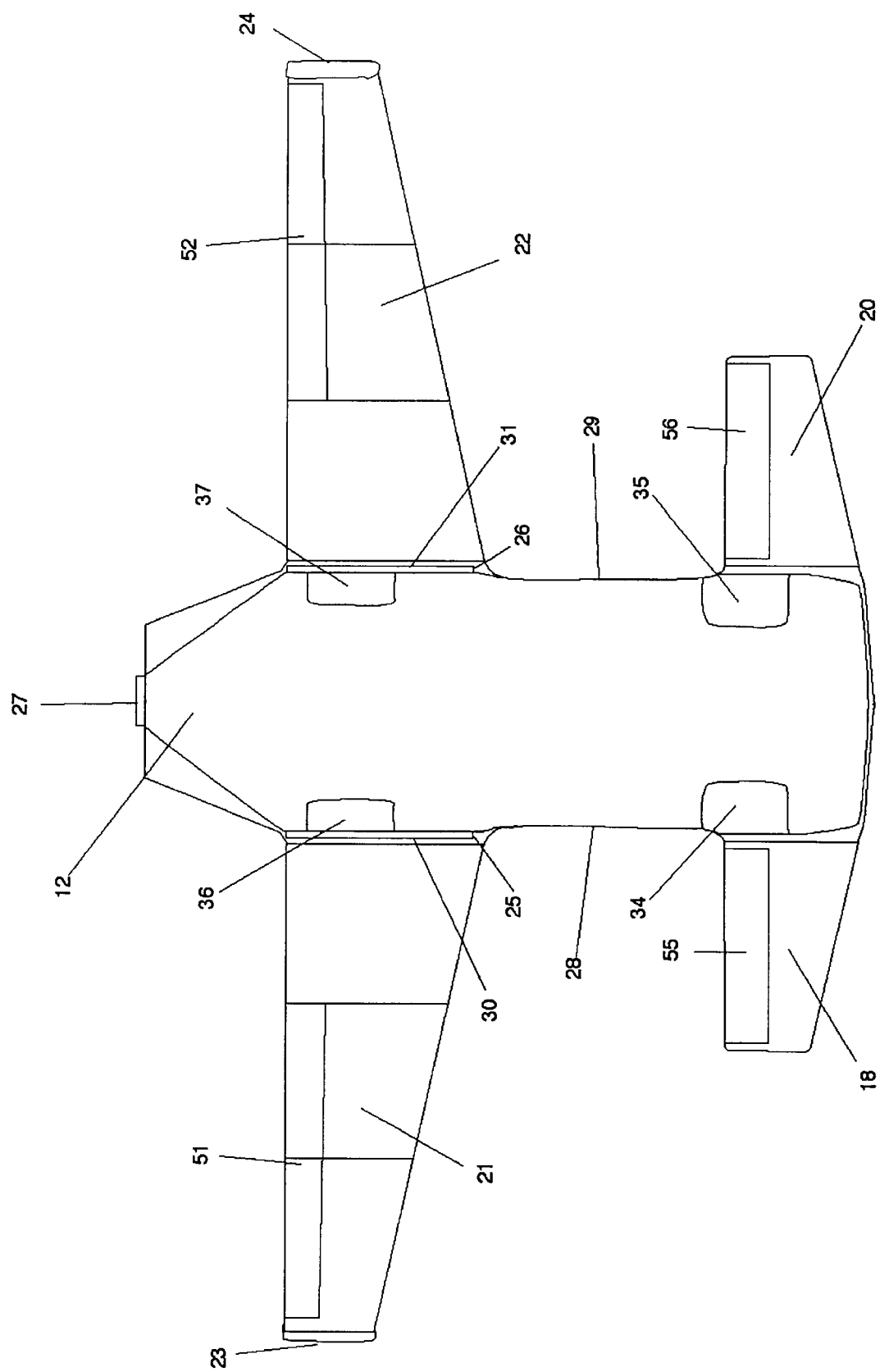
FIG. 6 is a view from below in air mode.
Figure 8:
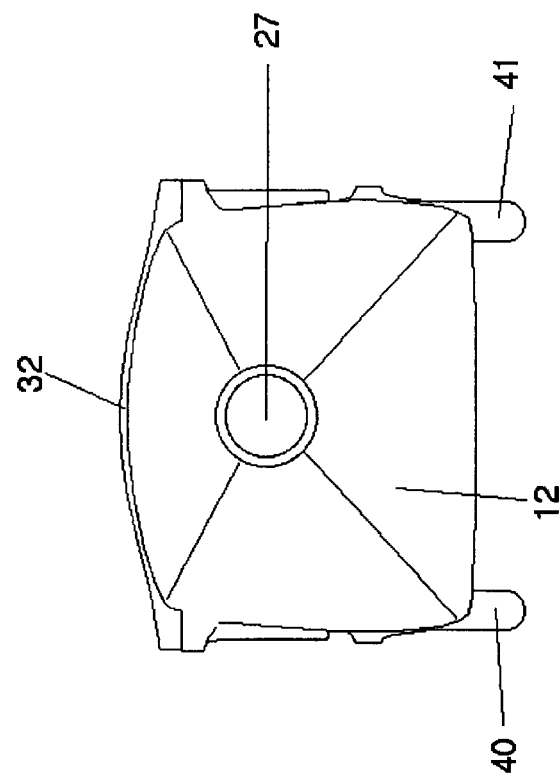
FIG. 8 is a view from rear in road mode.
Figure 7:
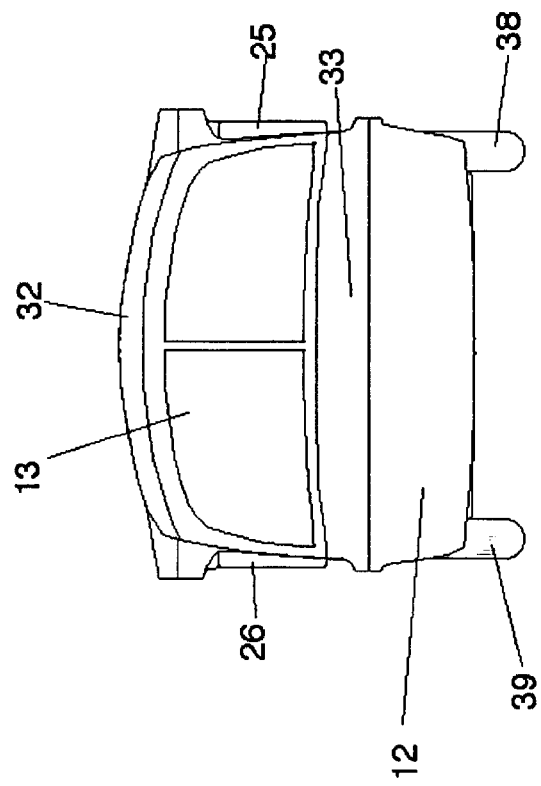
FIG. 7 is a view from front in road mode.
Figure 9:
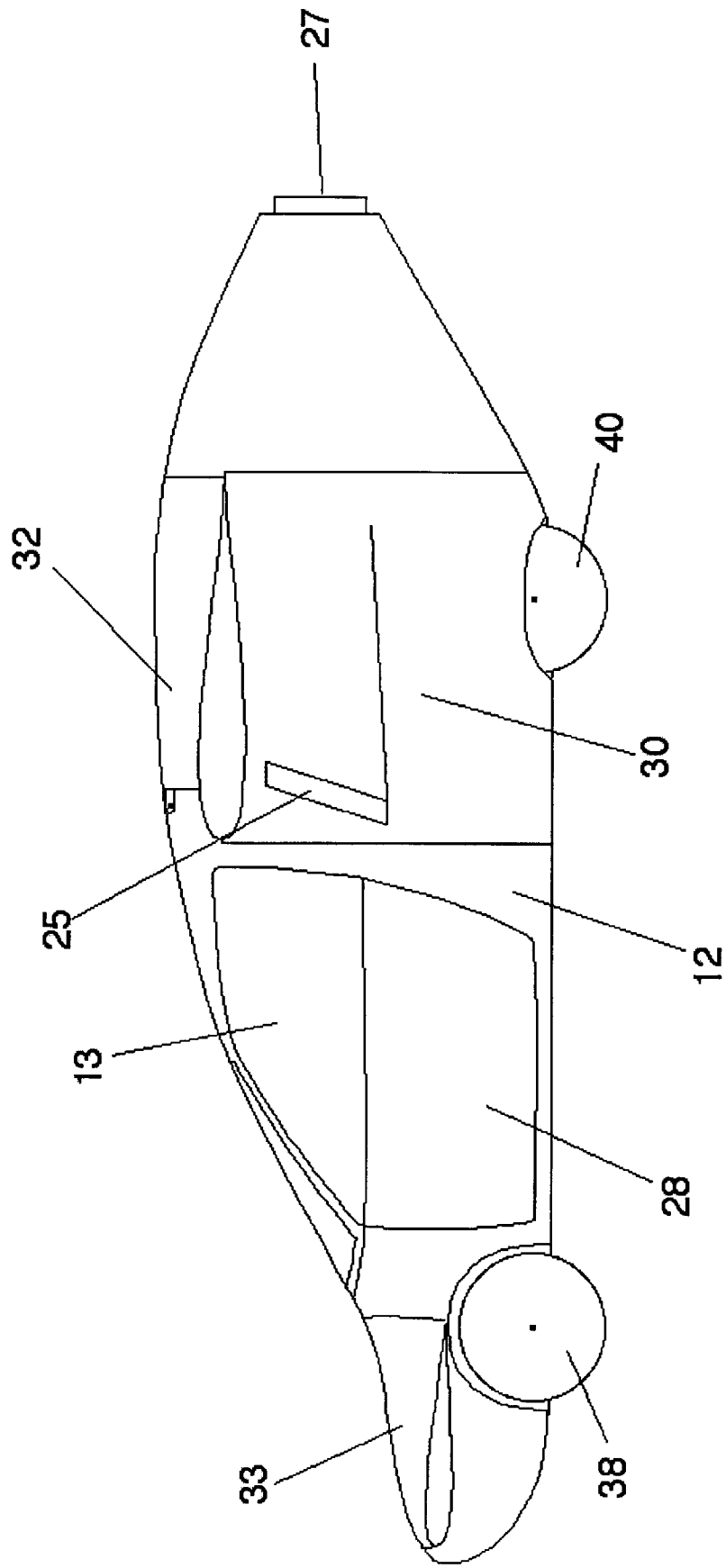
FIG. 9 is a view from left side in road mode.

The present invention comprises a vehicle that may be driven on the road as an automobile and also flown as an aircraft. FIGS. 1, 2, 3, 4, 5, and 6 provide front, rear, side, center cross section side, top and bottom views respectively of the present road/air vehicle in air configuration with wheels retracted. The elements shown are a body structure 12, having a cockpit 13, with seating for at least two occupants 79, with access provided by a left occupant access door 28 and corresponding right occupant access door 29. A forward left canard wing 18 and a corresponding right canard wing 20 are shown as well as a left main wing 21 and corresponding right main wing 22 and a left stabilizing fin 23 and corresponding right stabilizing fin 24. A rearward portion contains a jet thrust engine 78 to provide motive power for flight operations with left intake vent 25, a corresponding right intake vent 26 and a single jet thrust outlet 27. A center forward section contains an automobile engine/transmission unit 80 to drive the front wheels during ground operations. A rearward compartment enables storage of the main wing panels in road configuration and has a left access door 30, a corresponding right access door 31 and a top access door 32. An upper forward compartment, to enable storage of the canard wing panels in road configuration, has a top access door 33. The left forward compartment has an access door 34 and a corresponding right forward compartment has an access door 35 to enable retraction of front wheels, 38 and 39, inside the body. A left rearward compartment having an access door 36 and a corresponding right rearward compartment having an access door 37, enables retraction of rear wheels, 40 and 41, inside the body. Directional control is achieved through movable flight surfaces on the wings and fins. A left aileron 51 and a corresponding right aileron 52 provide roll control. A left rudder 53 and a corresponding right rudder 54 provide yaw control. A left elevator 55 and a corresponding right elevator 56 provide pitch control.

FIGS. 7, 8, 9, 10 and 11 provide front, rear, side, top and bottom views respectively of the present road/air vehicle in road configuration. The main elements shown are: A body structure 12, having a cockpit 13, with seating for at least two occupants, with access provided by a left occupant access door 28 and corresponding right occupant access door 29. A rearward portion containing a jet thrust engine to provide motive power for flight operations with left intake vent 25, a corresponding right intake vent 26 and a single jet thrust outlet 27. A rearward compartment, to enable storage of the main wing panels in road configuration, having a left access door 30, a corresponding tight access door 31 and a top access door 32. An upper forward compartment, to enable storage of the canard wing panels in road configuration, having a top access door 33. A left front wheel 38 and corresponding right front wheel 39. A left rear wheel 40 and corresponding right rear wheel 41.

Figure 12:
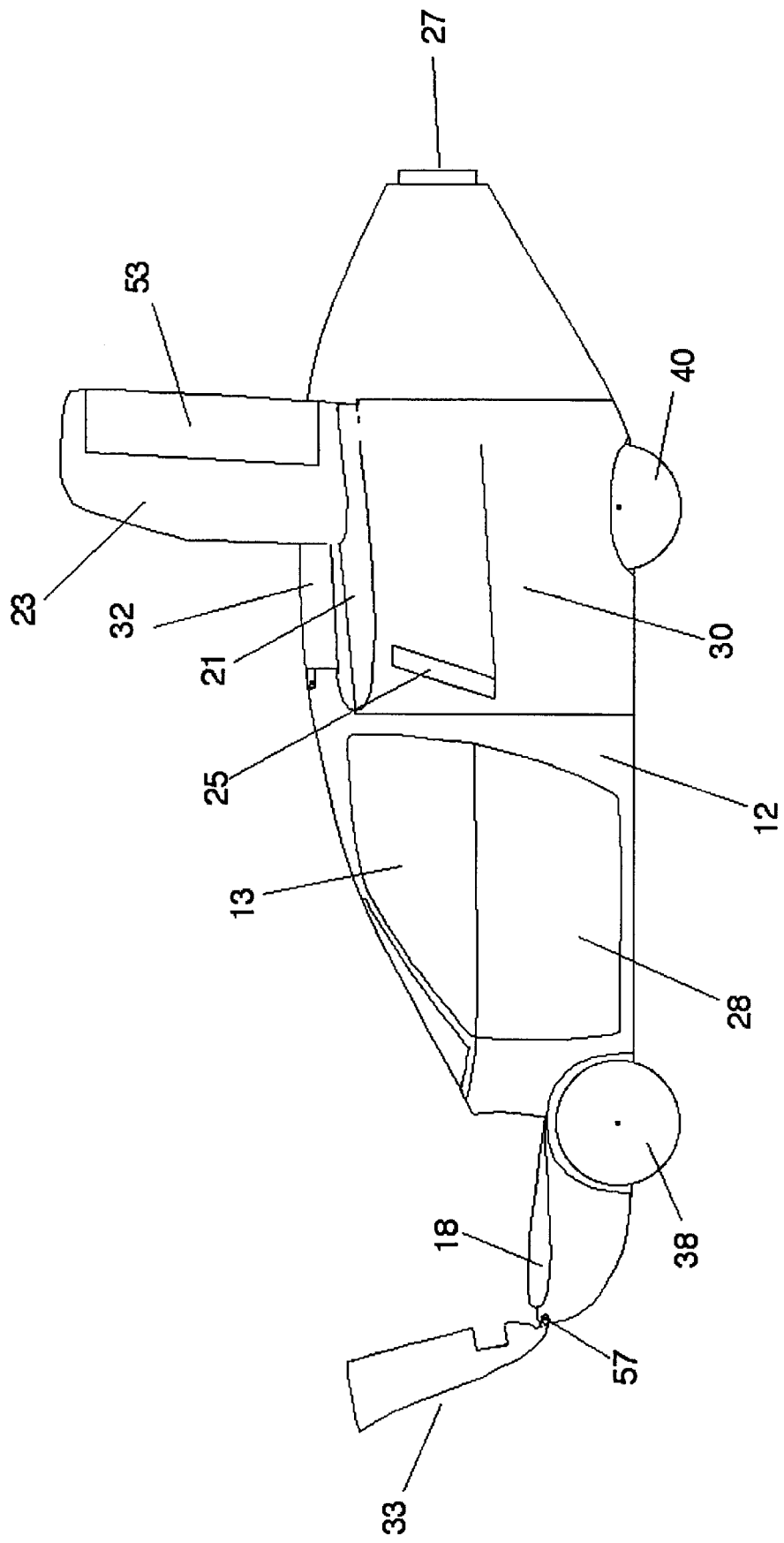
FIG. 12 is a view from left side showing stage 1 of canard folding.
Figure 13:
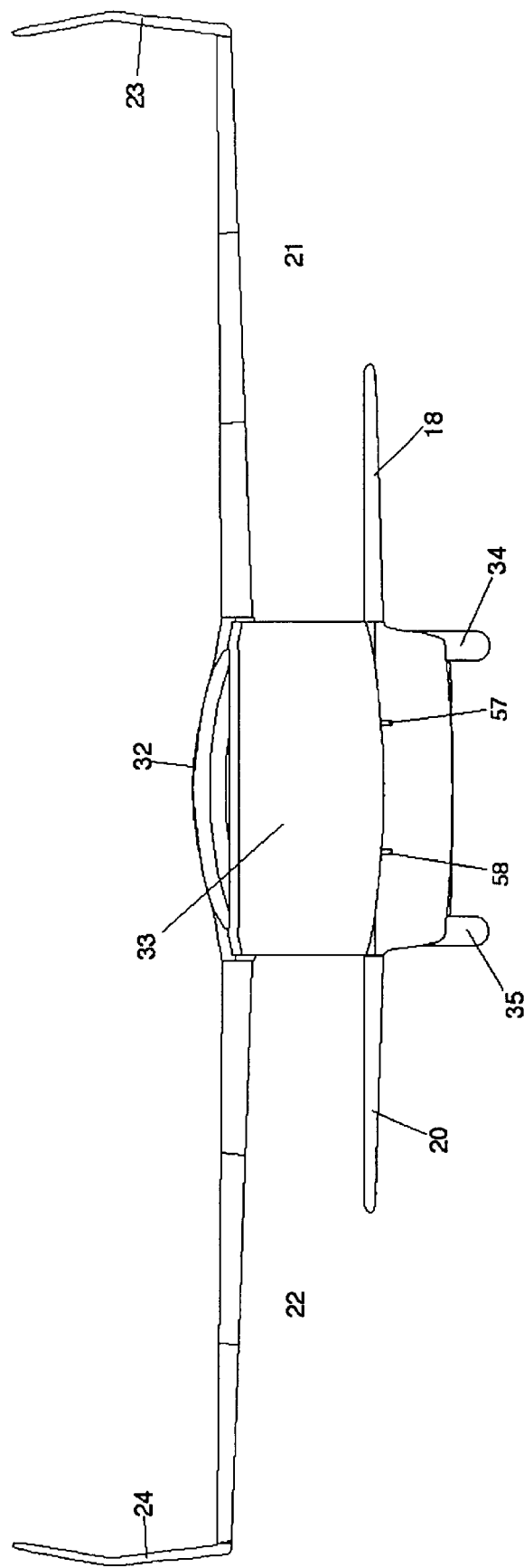
FIG. 13 is a view from front showing stage 1 of canard folding.
Figure 14:
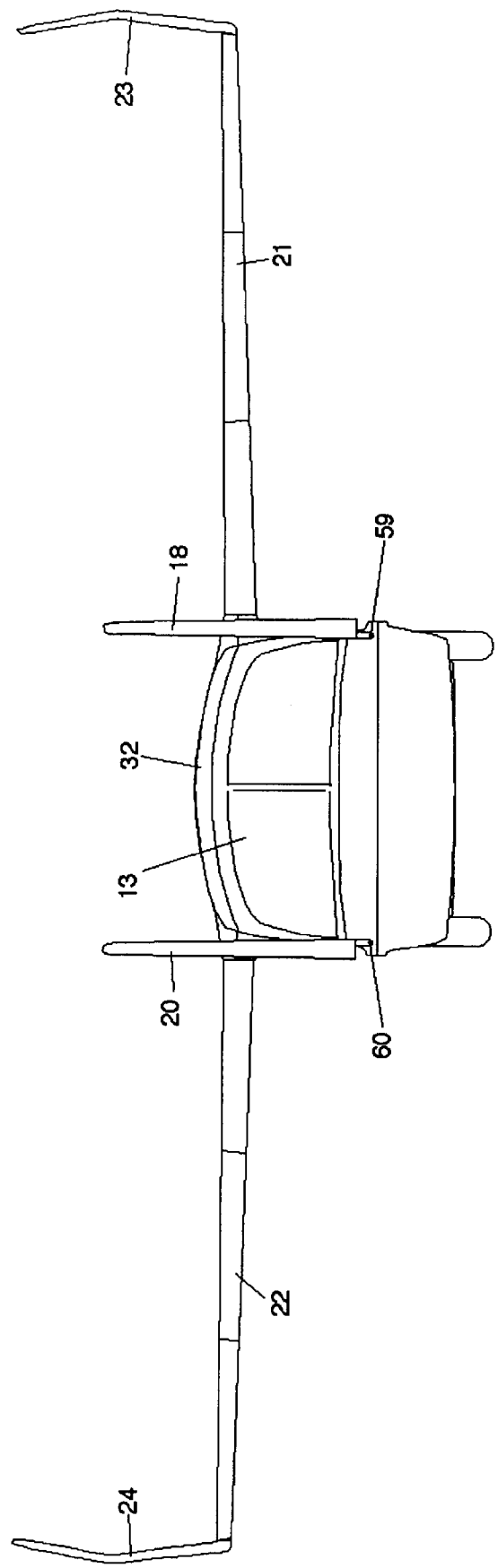
FIG. 14 is a view from front showing stage 2 of canard folding.
Figure 15:
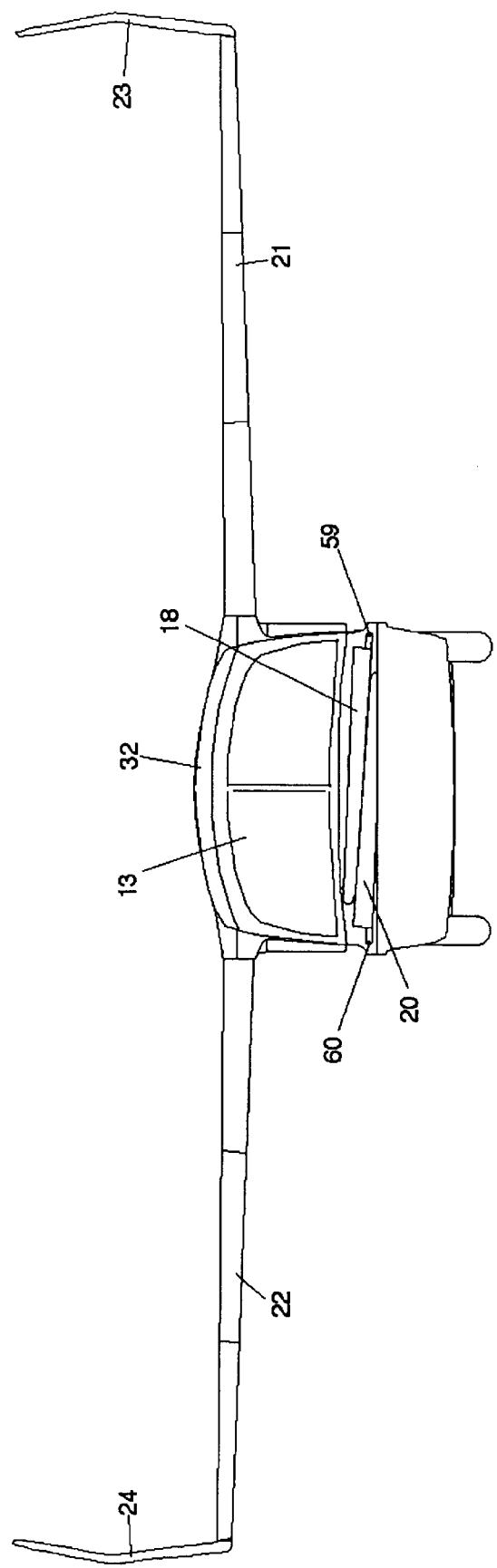
FIG. 15 is a view from front showing stage 3 of canard folding.

The folding of the canard wings from air configuration to road configuration is accomplished in the following manner. FIG. 12 shows a side view and FIG. 13 shows a front view of phase one of the process, where access door 33 is unlatched and swung open, pivoting at hinge points 57 and 58. Open door exposes a canard wing stowage compartment. FIG. 14 shows a front view of phase 2 of the process, where the canard wings 18 and 20 are unlatched and swung upwards approximately 90°, pivoting at hinge points 59 and 60. For clarity, FIG. 14 does not show access door 33. FIG. 15 shows a front view of phase 3 of the process, where the canard wings 18 and 20 have continued pivoting and have come to rest in their final stowed position. For clarity, FIG. 15 does not show access door 33. The $4^{th}$ and final stage of this process is the closure and re-latching of access door 33. The unfolding of the canard wings from road configuration to air configuration is the reverse of the above procedure.

Figure 16:
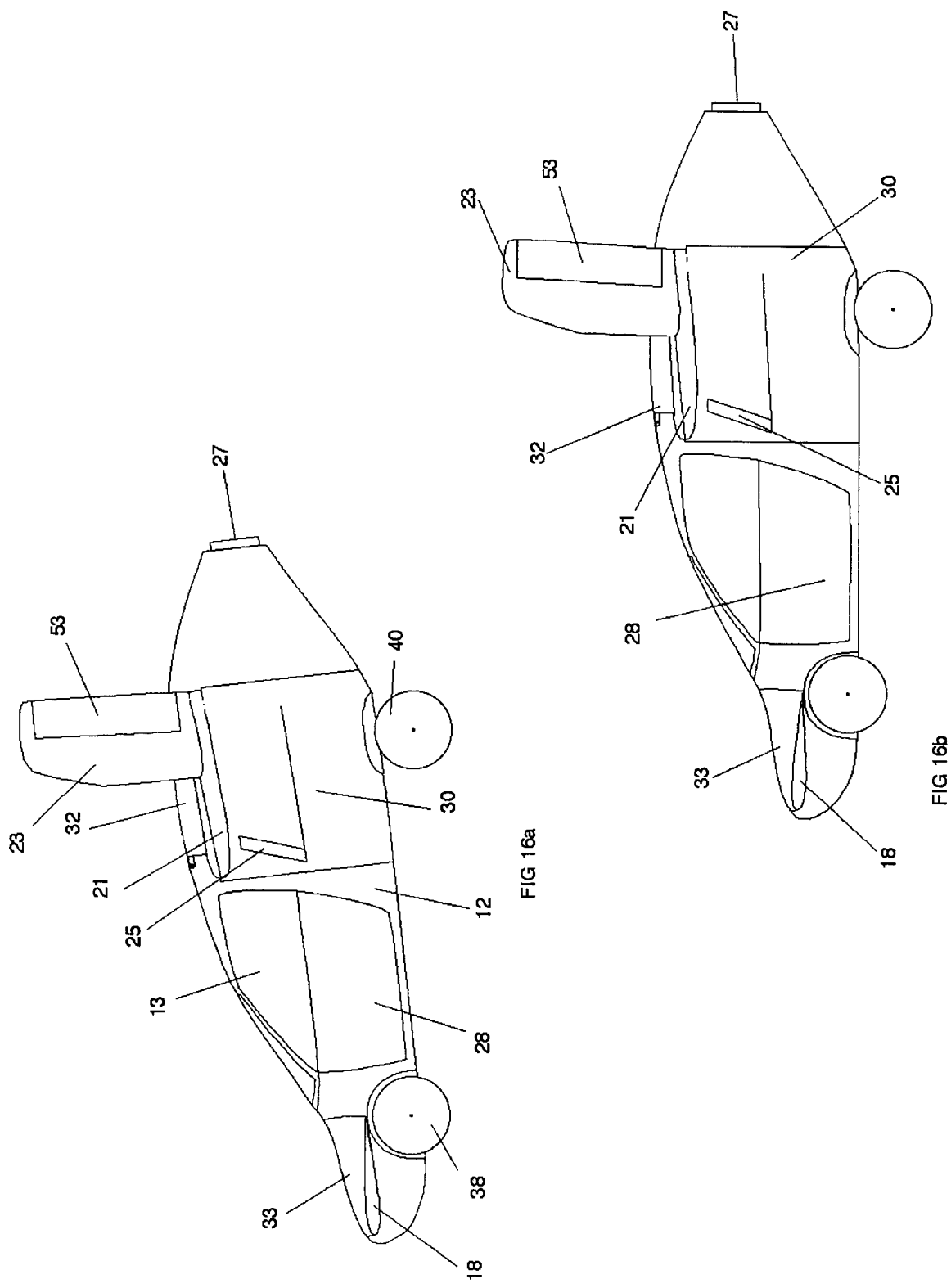
FIGS. 16a and b are views from left side showing stage 1 of main wing folding.
Figure 17:
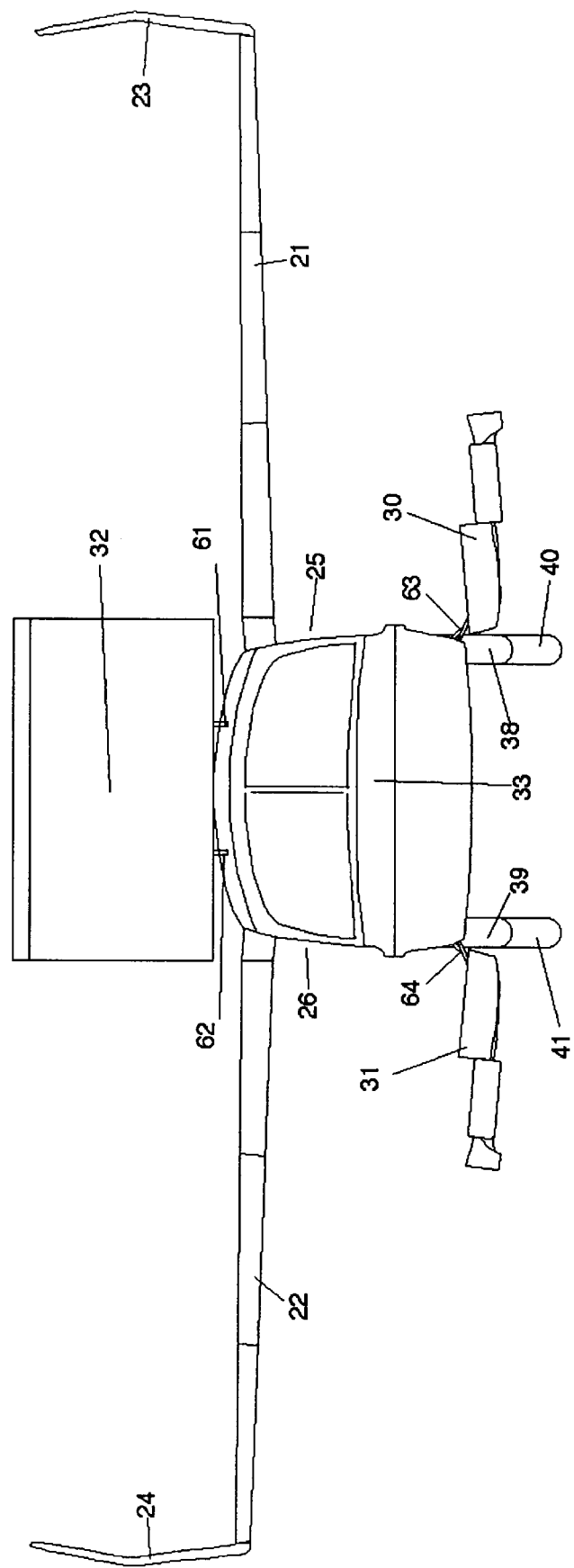
FIG. 17 is a view from front showing stage 2 of main wing folding.
Figure 18:
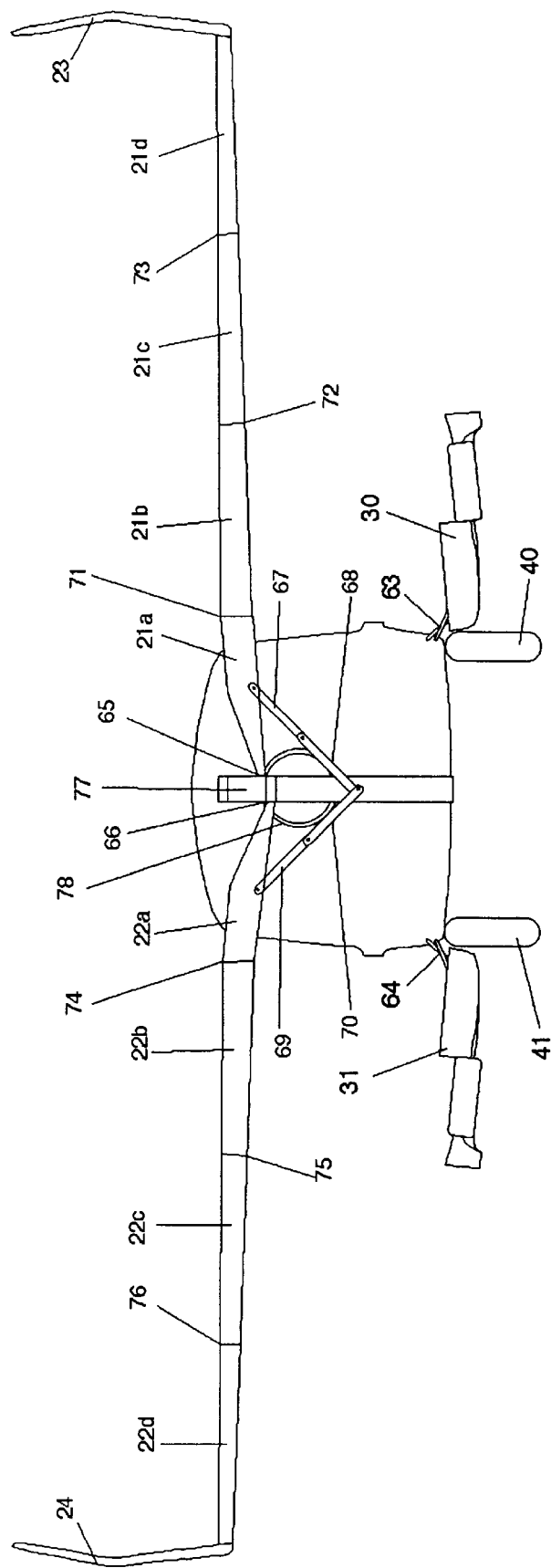
FIG. 18 is a sectional view from front along lines 18—18 of FIG. 5 showing stage 2 of main wing folding.
Figure 19:
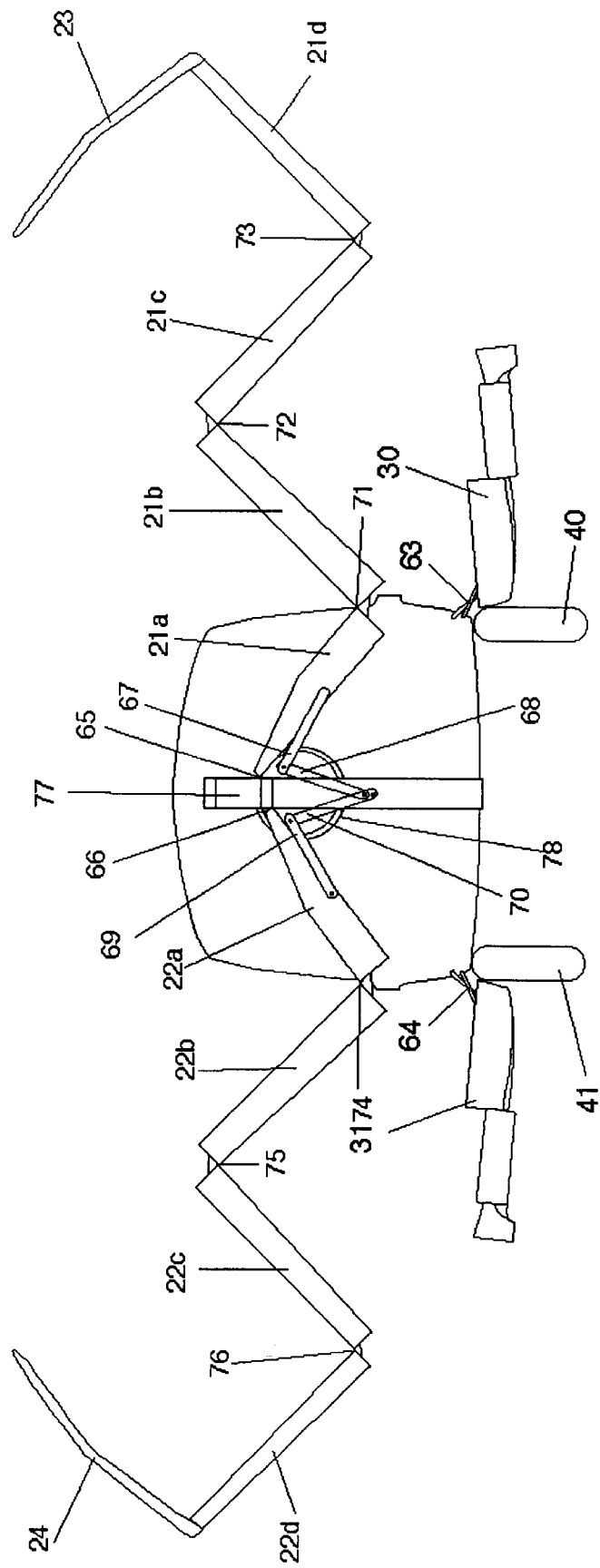
FIG. 19 is a sectional view from front showing stage 3 of main wing folding.
Figure 20:
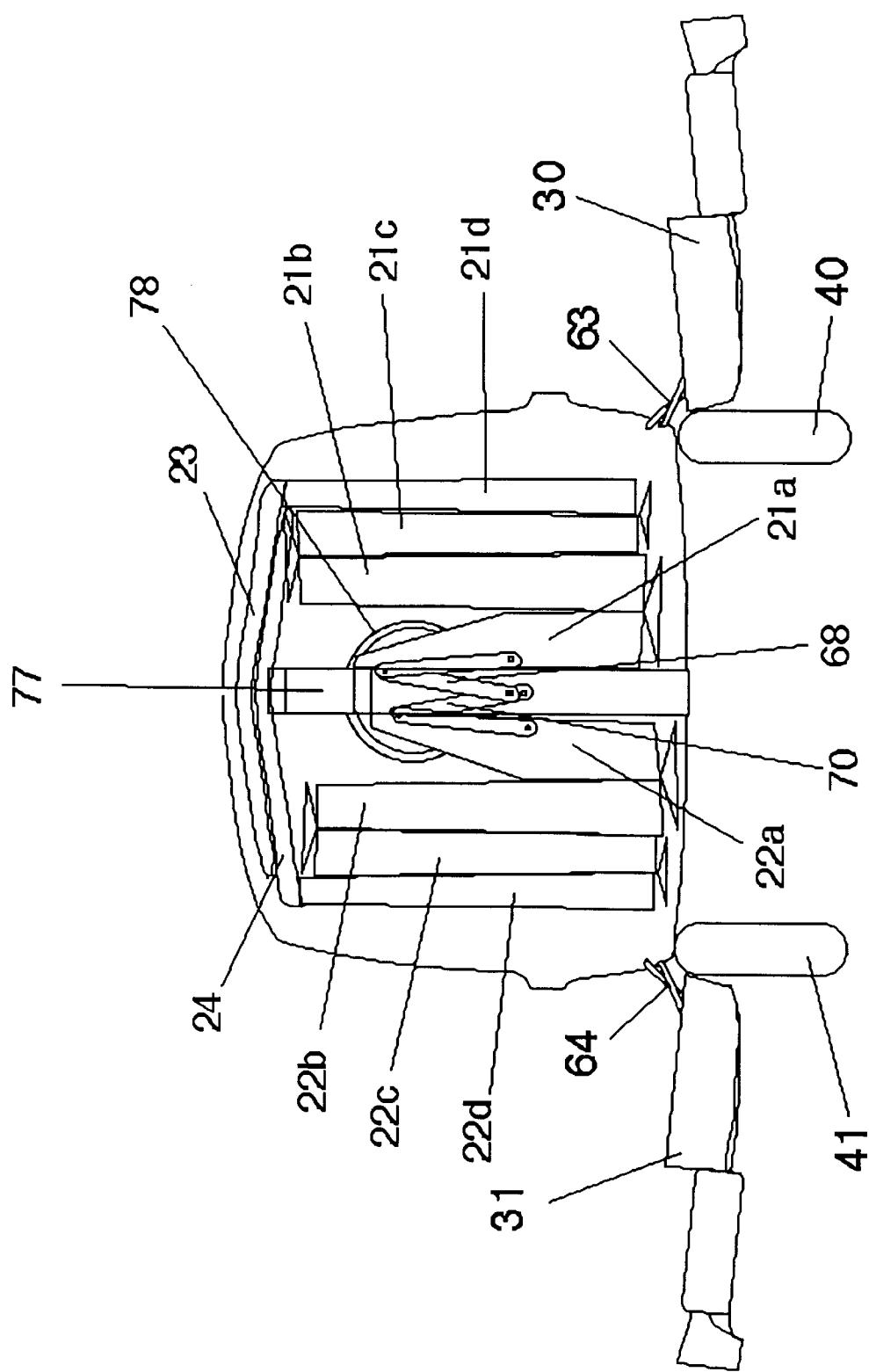
FIG. 20 is a sectional view from front showing stage 4 of main wing folding.
Figure 21:
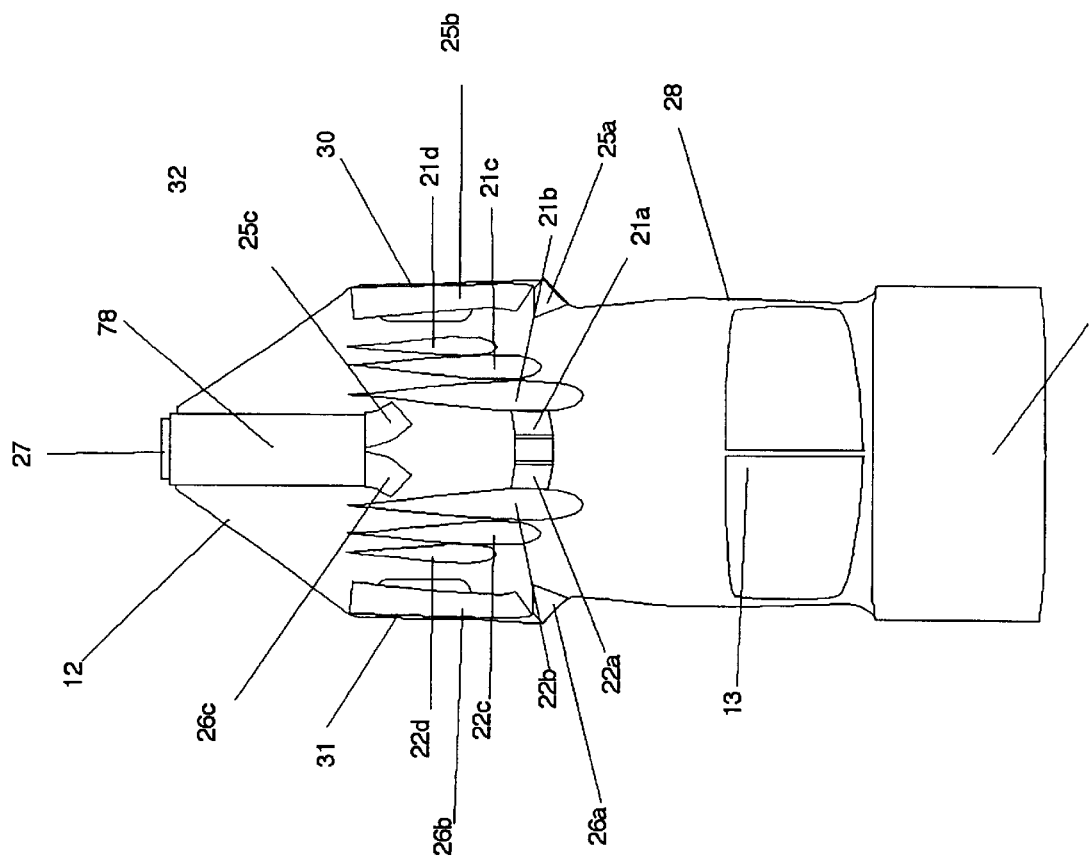
FIG. 21 is a sectional view from above along lines 21—21 of FIG. 3 showing stage 4 of main wing folding.
Figure 22:
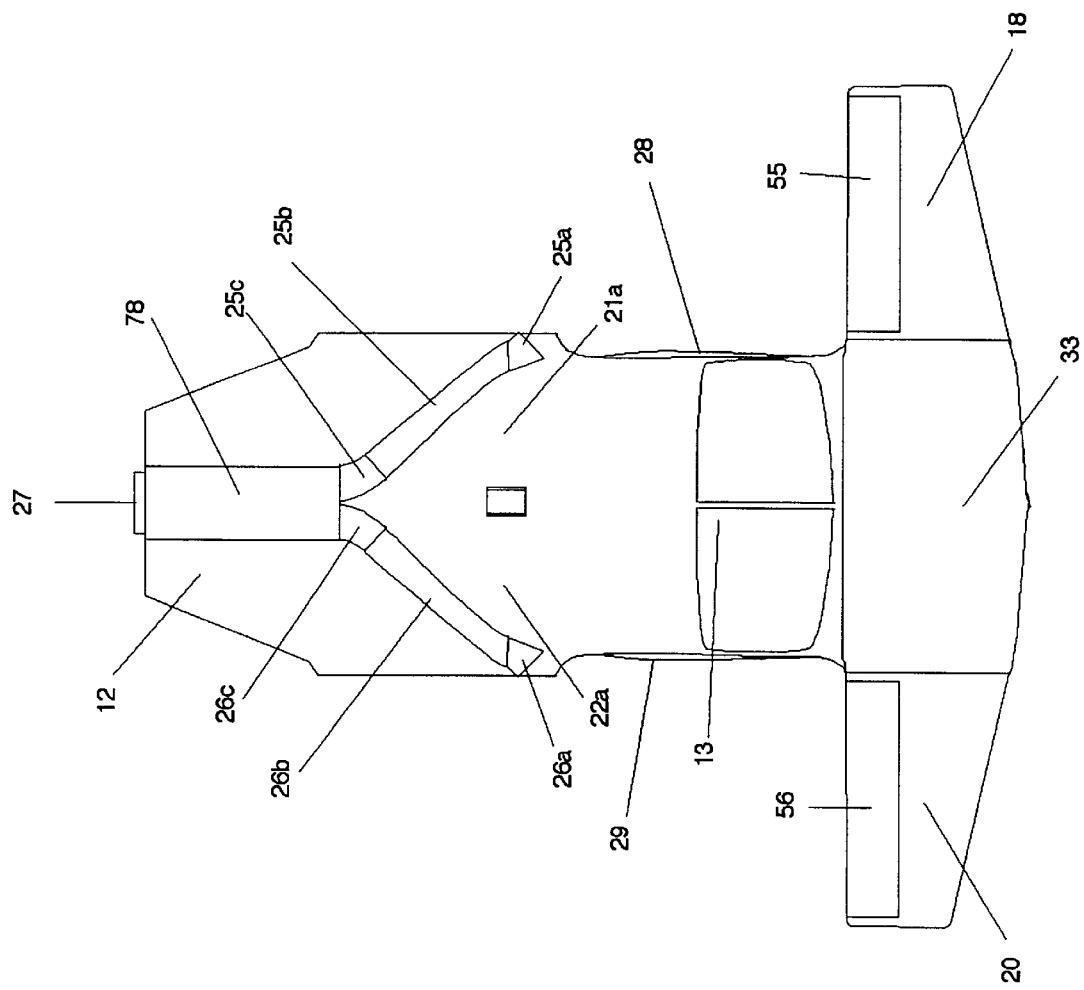
FIG. 22 is a sectional view from above showing jet engine intake vents in air mode.

The folding of the main wings from air configuration to road configuration is accomplished in the following manner. FIG. 16 show a side view of phase one of the process, where the rear main wheels, 40 and 41 are extended below the body. In the actual process the craft would appear as in FIG. 16a, with the rear of the body raised. For the sake of clarity, however, all following illustrations of this process are from the perspective of FIG. 16b, where the craft is shown level with the wheels extended below. FIG. 17 shows the second stage of this process, the unlatching and opening of top access door 32, left access door 30 and right access door 31. Top access door is swung upwards approximately 90°, pivoting at hinge points 61 and 62. Left and corresponding right access doors, 30 and 31 are swung outwards approximately 90°, with more complex pivoting means, 63 and 64, that allow for a lateral movement of the axis point in concert with the pivoting action. FIG. 18 is a front cross section at the plane shown, with access doors 30, 31 and 32 open. The structure of the left and right main wings, 21 and 22, are as follows: Left and corresponding right root segments, 21a and 22a, are hinged at hinge points 65 and 66. A left pair of hinged tension arms, 67 and 68, prevent the wing root segment 21a from upward travel beyond the position shown. A corresponding right pair of hinged tension arms, 69 and 70, prevent the wing root segment 22a from upward travel beyond the position shown. Three further left wing segments, 21b, 21c and 21d, are joined together through hinging and locking means not shown. The left tip segment 21d is permanently attached to the left tip fin 23. Three further right wing segments, 22b, 22c and 22d, are joined together through hinging and locking means not shown at the pivot points of 74, 75, and 76. The right tip segment 22d is permanently attached to the right tip fin 24. All flight forces resolve into a center spine 77. FIG. 19 shows the main wings part way through the third stage of folding, as each segment hinges at their respective pivot points. FIG. 20 shows the fourth stage of folding the main wings. Each wing segment has been hinged until they are all approximately parallel and vertical, one upon the other. The fifth stage is the closure and re-latching of the left, right and top access doors, 30, 31 and 32. The Sixth and final stage is the retraction of the rear wheels 40 and 41, back to normal road configuration position. FIG. 21 is a sagital cross section established at the center of jet thrust engine 78 with the craft in road mode. It shows the position of the folded main wing segments, 21*a* through *d* and 22*a* through *d*, in relationship to the jet thrust engine 78. Also shown are the positions of the left and corresponding right intake vents 25 and 26. Where each of the two vents is divided into three segments. Segment a and c remain in the same position during transition from air mode to road mode. However segments b rotate laterally at a hinge joint at segments a so that they during road mode they are essentially parallel with the outside surface of the left and corresponding right access doors 30 and 31. FIG. 22 is a sagital cross section established at the center of jet thrust engine 78 with the craft in air mode. It shows the position of the left and corresponding right jet intake vents as deployed in air mode to conduct air intake the to jet thrust engine 78.

Figure 23C:
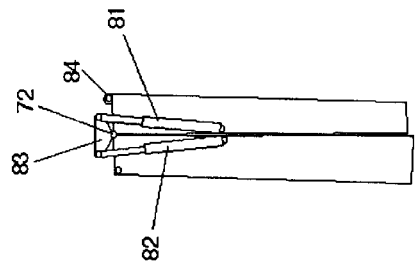
FIGS. 23a through c are schematics of hinging means between main wing segments 21b and 21c.
Figure 23B:
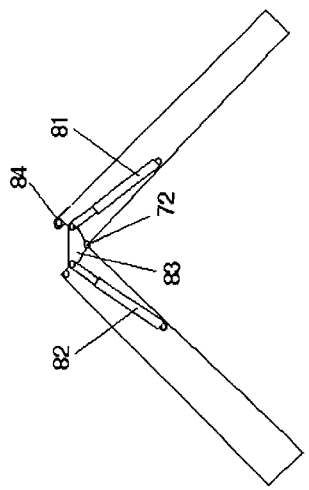
Figure 23A:
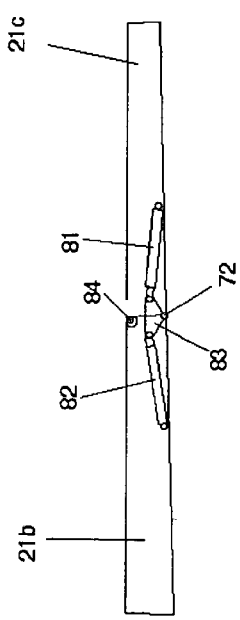

FIG. 23*a* shows the hinging and locking means between main wing segments 21*b* and 21*c*. One end of each linear actuator 81 and 82 are connected to a central plate 83 which is free to rotate about hinge pin 72, which is the common hinge point of the wing segments 21*b* and 21*c*. The other end of each linear actuator is connected to a point within the relevant wing segment. A locking pin means 84 secures the wing segments in position until folding is desired. Once locking pin 84 is withdrawn, the two wing segments are free to rotate about hinge pin 72. As linear actuators 81 and 82 are extended, the wing segments are each caused to rotate 90° so that they eventually lie parallel with each other (FIGS. 23*b* and 23*c*). The unfolding of the two wing segments is essentially the reverse of this process. Each of the hinging and locking means between other segments of the main wings as well as the hinging and locking means of the left and right canard wings, 18 & 20, follows the pattern illustrated.

FIGS. 24*a* and 24*b* show the suspension and wheel retraction system of the rear wheels, the view is a longitudinal cross section showing the right rear wheel 41. The wheel 41 is affixed to a trailing arm 85 which is free to pivot about hinge means 87. The upper end of hydraulic/pneumatic unit 86 is fixed by a pin bearing means to the body of the craft, the lower end is fixed by a pin bearing means to the trailing arm. The wheel may thus be hydraulically raised and lowered. The hydraulic/pneumatic unit also provides shock absorption during road mode. The arrangement of the suspension and wheel retraction system of the left rear wheel 40 is the laterally symmetrical equivalent of the right wheel.

Figure 25A:
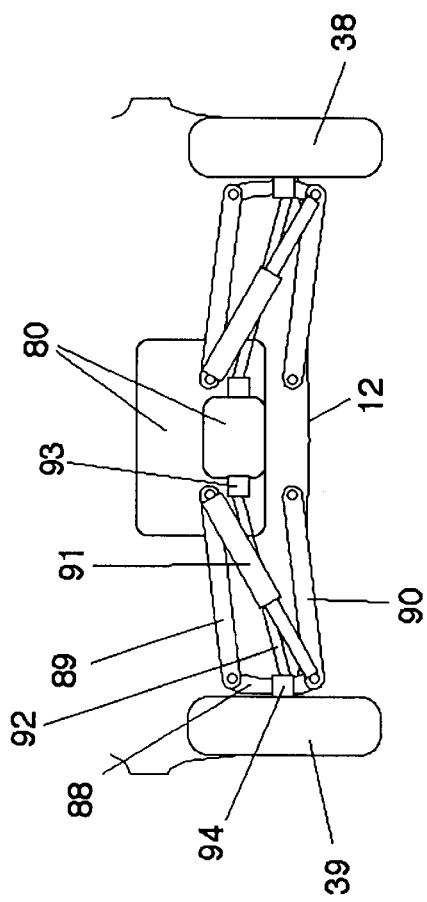
FIGS. 25a and b are schematics of suspension and wheel retraction means of front wheels.
Figure 25B:
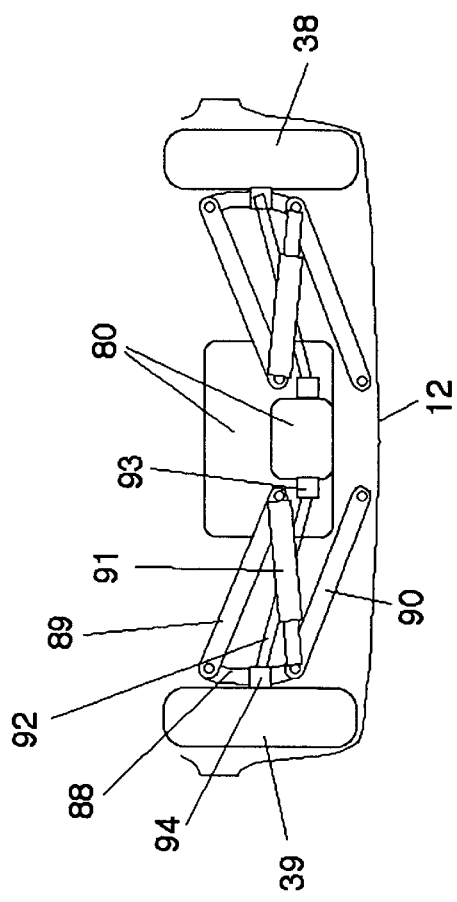

FIGS. 25*a* and 25*b* show the suspension, wheel retraction system and power transmission system of the front wheels, the view is a transverse cross section. In essence this system is the common system utilized by many front wheel drive automobiles. The right wheel 39 is affixed to a vertical member 88 which is connected by pin bearing means to upper strut 89 and lower strut 90. These struts are in turn connected by pin bearing means to the structure of the craft. The inner end of hydraulic/pneumatic unit 91 is fixed by a pin bearing means to the body of the craft, the outer end is fixed by a pin bearing means to the outer extent of the lower strut 90. The wheel may thus be hydraulically raised and lowered. The hydraulic/pneumatic unit also provides shock absorption during road mode. Power is transmitted to the wheel 39 from automobile engine/transmission unit 80 through universal joint 93 to drive shaft 92 which has a sliding splined connection to constant velocity joint 94. This arrangement, common to most front wheel drive automobiles, allows power to be transmitted to the wheel at all positions of the suspension and during turns. The arrangement of the suspension, wheel retraction system and power transmission system of the left front wheel 38 is the laterally symmetrical equivalent of the right wheel.

Moreover, having thus described the invention, it should be apparent that numerous structural modifications and adaptations may be resorted to without departing from the scope and fair meaning of the instant invention as set forth hereinabove and as described hereinbelow by the claims.

I claim:

1. A hybrid vehicle capable of flying and ground operation driving comprising, in combination:

a body structure for carrying at least one person therein said body structure including plural storage compartments therein;

said body structure including a forward body portion, a central body portion, and a rearward body portion, with a first powerplant for flight operations installed in said rearward body portion thereof and a second powerplant for ground operations installed in said body structure;

a left and an opposite right main wing affixed to said central portion of said body structure and hinged to facilitate folding and stowage of said main wings in comrpartments situated within said body structure said main wings including inboard root segments hinged to rotate within said body structure;

a left and an opposite right stabilizing surface projecting upwards from tips of said main wings and;

a left and an opposite right canard wing affixed to said forward body portion thereof and hinged to facilitate stowage of said canard wings in one said storage compartments situated within said body structure.

2. The hybrid according to claim 1 including: said left and said opposite right main wing comprised of four sections connected one to another and to said body by hinging and locking means to facilitate extension of said main wings for flight operations and folding of said main wings for ground operations.

3. The hybrid according to claim 1, including: said left and said opposite right main wing, each comprised of four sections, a center section, which remains at all times within the extent of said body structure, and three outer sections, which are within an extent of said body structure in road driving configuration and external to the extent of said body structure in air flying configuration.

4. The according to claim 1, including: said left and said opposite right main wing comprised of four sections, a center section connected to said body by hinging and locking means, a second section lateral to said center section connected to said center section by hinging and locking means, a third section lateral to said second section connected to said second section by hinging and locking means, a tip section lateral to said third section connected to said third section by hinging and locking means.

5. The according to claim 1, including: said left and said opposite right canard wing connected to said body by hinging and locking means to facilitate extension of said canard wings for flight operations and folding of said canard wings for ground operations.

6. The hybrid according to claim 1, including: said left and said opposite right canard wing are within an extent of the body in road configuration and external to the extent of the body in air configuration.

7. The hybrid according to claim 2, including a left and an opposite right sealed compartment for secure stowage of said folded main wings for ground operations.

8. The hybrid according to claim 1, including a stowage compartment for secure stowage of said left and said opposite right canard wing for ground operations.

9. The hybrid according to claim 1, wherein said second power plant includes an engine and a transmission means operatively intercoupled to provide torque to drive one or more wheels on said body structure for ground operations.

10. The hybrid according to claim 1, wherein at least one jet thrust engine in said body structure provides forward thrust for flight operation.

11. The hybrid according to claim 1, including a laterally symmetrical wheel or undercarriage configuration comprising two forwardly disposed wheels for steering during surface operation and two rearwardly disposed wheels.

12. The hybrid according to claim 11, including a means for retracting each said wheel.

13. A hybrid vehicle capable of flying and ground operation driving comprising, in combination:
- a body structure for carrying at least one person therein said body structure including plural storage compartments therein;
- said body structure including a forward body portion, a central body portion, and a rearward body portion, with a first powerplant for flight operations installed in said rearward body portion thereof and a second powerplant for ground operations installed in said body structure;
- a left and an opposite right main wing affixed to said central portion of said body structure and hinged to facilitate folding and stowage of said main wings in compartments situated within said body structure;
- a left and an opposite right stabilizing surface projecting upwards from tips of said main wings;
- a left and an opposite right canard wing affixed to said forward body portion thereof and hinged to facilitate stowage of said canard wings in one said storage compartments situated within said body structure; and
- said left and said opposite right main wing, each comprised of four sections, a center section, which remains at all times within the extent of said body structure, and three outer sections, which are within an extent of said body structure in road driving configuration and external to the extent of said body structure in air flying configuration.

14. A hybrid vehicle capable of flying and ground operation driving comprising, in combination:
- a body structure for carrying at least one person therein said body structure including plural storage compartments therein;
- said body structure including a forward body portion, a central body portion, and a rearward body portion, with a first powerplant for flight operations installed in said rearward body portion thereof and a second powerplant for ground operations installed in said body structure;
- a left and an opposite right main wing affixed to said central portion of said body structure and hinged to facilitate folding and stowage of said main wings in compartments situated within said body structure;
- a left and an opposite right stabilizing surface projecting upwards from tips of said main wings;
- a left and an opposite right canard wing affixed to said forward body portion thereof and hinged to facilitate stowage of said canard wings in one said storage compartments situated within said body structure; and
- said left and said opposite right main wing comprised of four sections, a center section connected to said body by hinging and locking means, a second section lateral to said center section connected to said center section by hinging and locking means, a third section lateral to said second section connected to said second section by hinging and locking means, a tip section lateral to said third section connected to said third section by hinging and locking means.

15. A hybrid vehicle for both flying and terrain traversal comprising in combination:
- a fuselage body and a source of motive power residing within said body;
- a left canard wing and a right canard wing;
- said wings operatively coupled to said fuselage body to assume on of two positions
- a flight position where said wings project out from said fuselage and a terrain traversal position where said wings are folded and stored within said fuselage body,
- wherein said main wings each connect to a center spine located in said fuselage, said spine disposed centrally along a long axis of said fuselage.

16. The vehicle of claim 15 wherein said canard wings are located forward of said main wings.

17. The vehicle of claim 15 including storage compartments within said fuselage body to store said wings in a folded state, and doors overlying said compartments both when said wings are stored and deployed.

18. The vehicle of claim 17 including hinge means on said canard wings to lay a portion of one said canard wing atop another when said canard wings are disposed in one said storage compartment.

19. The vehicle of claim 15 wherein said main wings are formed from plural segments interconnected by hinge means and each said main wing includes a root segment hinged to a center spine and dimensioned to rotate and be stored within said fuselage body.

* * * * *